US007227963B1

(12) United States Patent
Yamada et al.

(10) Patent No.: US 7,227,963 B1
(45) Date of Patent: Jun. 5, 2007

(54) AUDIO SIGNAL PROCESSING APPARATUS

(75) Inventors: Youichi Yamada, Saitama-ken (JP); Takeaki Funada, Saitama-ken (JP); Hiroyuki Isobe, Saitama-ken (JP); Keitaro Kaburagi, Saitama-ken (JP); Naomi Amemiya, Saitama-ken (JP); Gen Inoshita, Tokyo (JP); Ko Atsumi, Tokyo (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/359,416

(22) Filed: Jul. 23, 1999

(30) Foreign Application Priority Data

Jul. 31, 1998 (JP) ................................ 10-217983

(51) Int. Cl.
*H04B 1/00* (2006.01)

(52) U.S. Cl. .......................................... 381/119; 369/4

(58) Field of Classification Search ................ 381/119; 700/94; 369/3-4
See application file for complete search history.

(56) References Cited

U.S. PATENT DOCUMENTS 4,859,922 A 8/1989 Tauchenitz et al.
5,060,272 A * 10/1991 Suzuki ....................... 381/119
6,438,241 B1 * 8/2002 Silfvast et al. .............. 381/119
6,452,082 B1 * 9/2002 Suzuki et al. ................. 84/609

FOREIGN PATENT DOCUMENTS

| | | | |
|---|---|---|---|
| DE | 37 22 752 | C2 | 5/1990 |
| GB | 2140248 | A | 11/1984 |
| GB | 2 299 492 | A | 10/1996 |
| GB | 2 301 002 | A | 11/1996 |
| GB | 2301002 | A | 11/1996 |
| GB | 2312135 | A | 10/1997 |
| WO | WO 80/01632 | A | 8/1980 |
| WO | WO 93/03549 | A | 2/1993 |
| WO | WO 99/37046 | A | 7/1999 |

OTHER PUBLICATIONS

K. O. Bäder; "Tonmischpulte"; Fernseh- und kino-Technik; May 8, 1996; pp. 230-233.

* cited by examiner

*Primary Examiner*—Xu Mei
(74) *Attorney, Agent, or Firm*—Arent Fox LLP

(57) ABSTRACT

An audio signal processing apparatus comprises a signal processing section for processing audio signals fed from outside equipments, an operating section for producing commands in order for said signal processing section to process the audio signals, a storing memory for storing past operation data containing past operation information of the operating section, a controller for setting parameters in order for said signal processing section to process the audio signals in accordance with said past operation data stored in said storing memory.

7 Claims, 13 Drawing Sheets

FIG.11
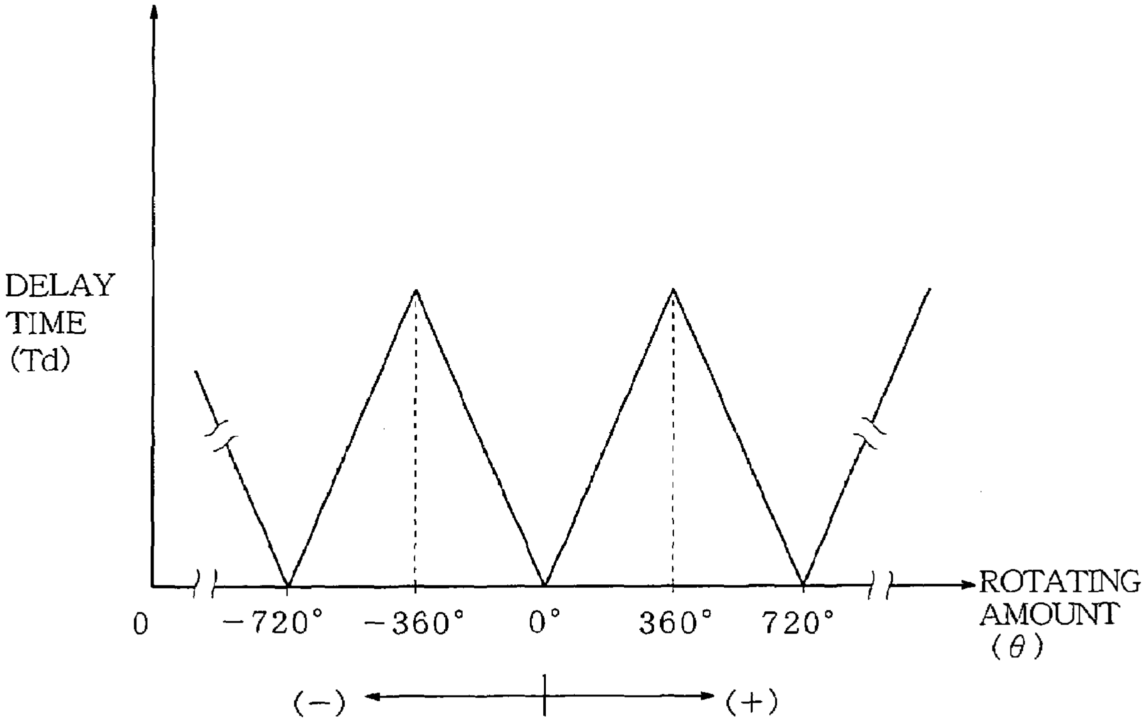
FIG.12A
FIG.12B
FIG.12C
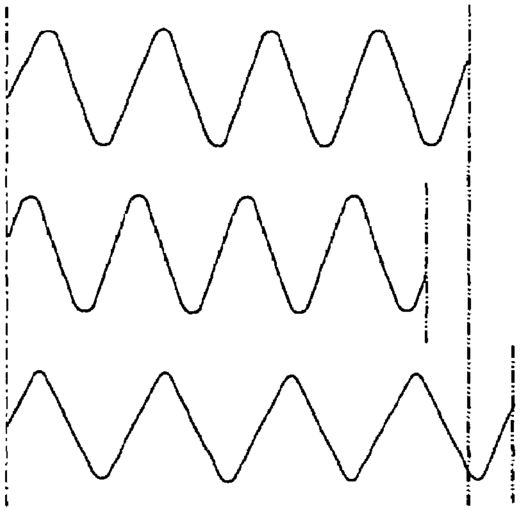

AUDIO SIGNAL PROCESSING APPARATUS

BACKGROUND OF THE INVENTION

The present invention relates to an audio signal processing apparatus for editing and processing audio signals.

Conventionally, there has been known an audio signal processing apparatus which is called EFFECTOR. This kind of audio signal processing apparatus is capable of processing audio signals of musical sound supplied from a recording/reproducing device so as to produce a musical sound having a higher performance effect. If the audio signal processing apparatus is used in a discotheque, a human operator can operate the apparatus to provide customers (people dancing disco in a discotheque) with more satisfactory musical sound, thereby improving an effect of disco dancing.

On the other hand, an audio signal processing apparatus described in the above usually includes many buttons and switches on an operating panel which are provided for performing many operations for effecting desired editing and processing of audio signals. The buttons and switches are required to be operated at a high speed since it is usually desired to produce a musical sound having a high performance effect.

In order to continuously provide disco dancers with satisfactory musical sound, many switches and buttons on the operating panel of the audio signal processing apparatus have to be operated to set the apparatus at desired functions. On the other hand, the selected functions will have to be cancelled or reset by operating the switches and buttons. Accordingly, the operation of such an audio signal processing apparatus is extremely troublesome, hence the operation efficiency is low.

SUMMARY OF THE INVENTION

It is an object of the present invention to provide an audio signal processing apparatus having an improved operability, capable of producing excellent musical effect, so as to solve the above-mentioned problems peculiar to the above-discussed prior arts.

According to the present invention, there is provided an audio signal processing apparatus, comprising: signal processing means for processing audio signals fed from outside equipments; operating means for setting parameters in order for said signal processing means to process the audio signals; storing means for storing past operation data containing past operation information of the operating means; control means for setting parameters in order for said signal processing means to process the audio signals in accordance with said past operation data stored in said storing means.

In one aspect of the present invention, the audio signal processing apparatus further comprises a first executing means enabling said storing means to store the past operation data, a second executing means enabling said signal processing means to process the audio signals in accordance with said past operation data stored in said storing means.

In another aspect of the present invention, said operating means includes a rotational body capable of setting parameters in order for said signal processing means to process the audio signals, in accordance with a rotating amount of the rotational body.

In a further aspect of the present invention, the rotational body of said operating means is connected with an optical pulse encoder for detecting an angular velocity and an rotating direction of the rotational body.

In a still further aspect of the present invention, the angular velocity and the rotating direction of the rotational body are used to calculate the rotating amount of the rotational body.

In one more aspect of the present invention, said signal processing means includes a digital signal processor comprising a JET processing block, a ZIP processing block, a WAH processing block, a RING processing block and a FUZZ processing block.

The above objects and features of the present invention will become better understood from the following description with reference to the accompanying drawings.

BRIEF DESCRIPTION OF DRAWINGS

FIG. 11 is a graph indicating a relationship between a rotating amount of a JOG dial and a delay time.

FIGS. 12A–12C are graphs indicating a principle for producing a ZIP performance effect.

DETAILED DESCRIPTION OF THE PREFERRED EMBODIMENTS

Figure 1:
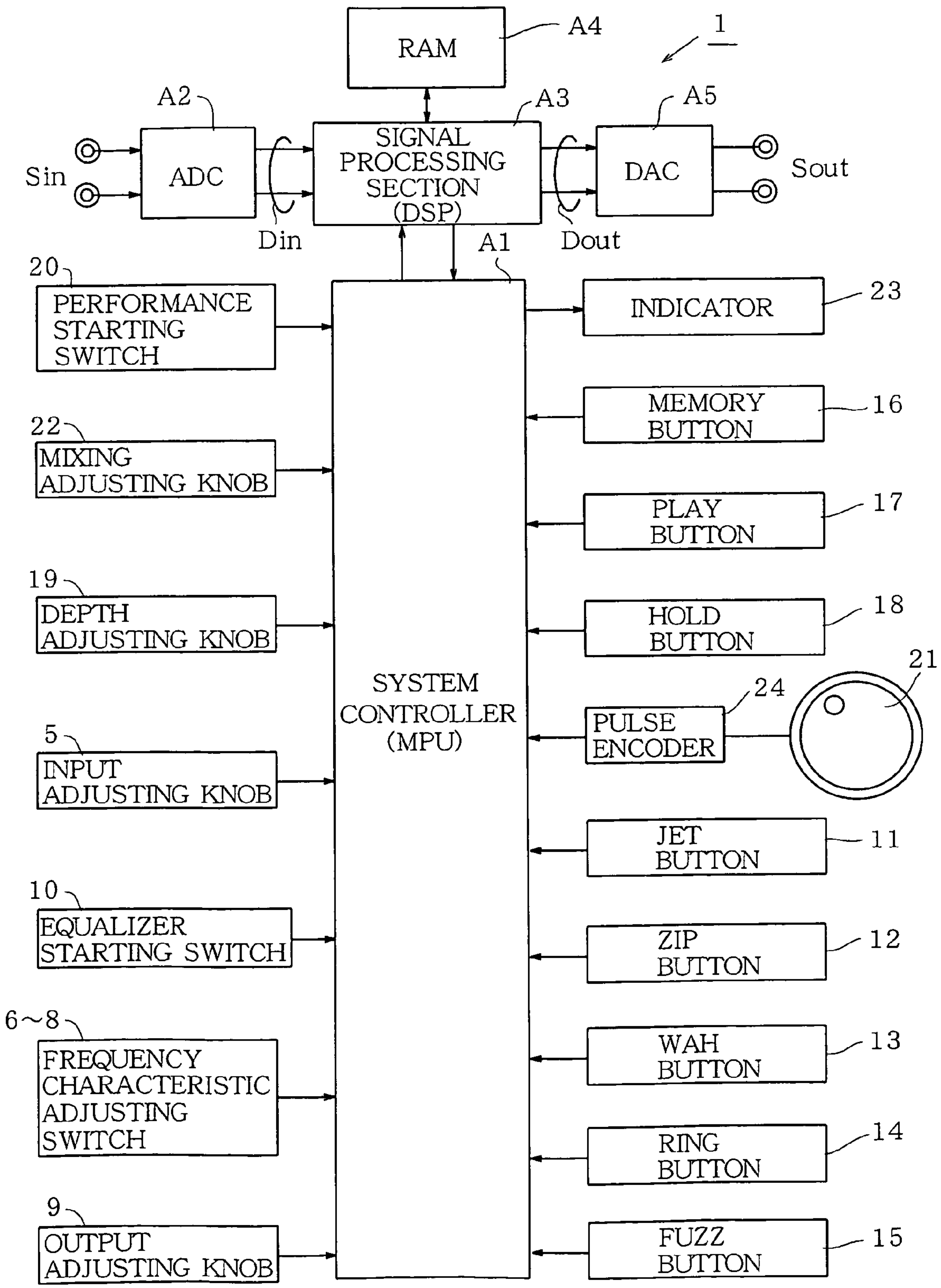
FIG. 1 is a block diagram indicating the constitution of an audio signal processing apparatus according to the present invention.

Referring to FIG. 1, an audio signal processing apparatus 1 of the present invention comprises a system controller A1 for controlling all operations of the apparatus 1, an A/D converter A2 for changing analogue stereo audio signal Sin (fed from outside) to digital data Din, a signal processing section A3 capable of processing various data for various musical performances, a storing section A4 for storing various data while the signal processing section 3 is in its operation, a D/A converter A5 for changing the digital data Dout from the signal processing section A3 to analogue audio signal Sout.

Various operating and indicating means 5–23, which will be described in detail later, are connected with the system controller A1.

The system controller 1 includes an MPU (microprocessor unit) capable of controlling all operations of the audio signal processing apparatus 1 in accordance with a system program prepared in advance. Once a human operator operates any of the above operating means, such an operation will be detected, so that the system controller 1 will set necessary parameters (for editing and processing audio signal) on the signal processing section A3, and to control the above indicator means.

The signal processing section A3 has a DSP (digital signal processor) which receives the parameters (for editing and processing audio signal) decided by the system controller 1 to process the digital data Din fed from the A/D converter A2.

Figure 2:
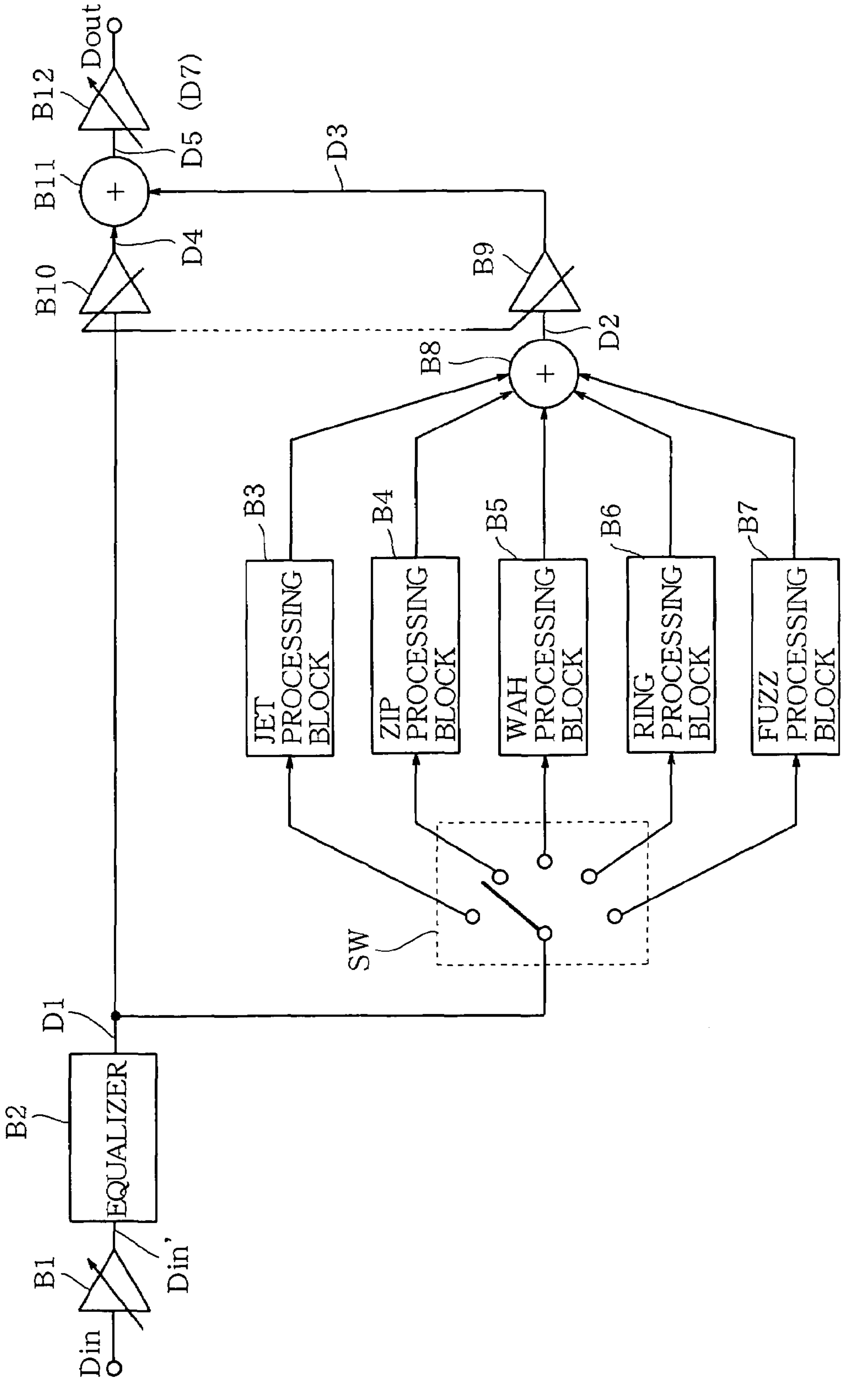
FIG. 2 is a block diagram showing an equivalent circuit indicating various functions of a DSP (Digital Signal Processor) contained in the audio signal processing apparatus of FIG. 1.

With the use of the DSP, an equivalent circuit can be formed as shown in FIG. 2.

Referring to FIG. 2, the equivalent circuit includes a variable amplifier B1 for adjusting an input level of digital data Din fed from the A/D converter A2, and an equalizer B2 capable of providing an equalizing function by variably adjusting the frequency characteristic of the digital data Din' fed from the variable amplifier B1.

The equalizer B2 is connected, through a change-over switch SW, to JET processing block B3, ZIP processing block B4, WAH processing block B5, RING processing block B6, FAZZ processing block B7. The equalizer B2 produces digital data D1 which are fed through the change-over switch SW to the processing blocks B3–B7. Thus, the processing blocks B3–B7 can process the digital data D1 for effecting JET performance, ZIP performance, WAH performance, RING performance and FAZZ performance.

Referring again to FIG. 2, the equivalent circuit further includes an adder B8 for adding together various digital data produced by the processing blocks B3–B7, a variable amplifier B9 for variably adjusting the level of digital data D2 produced by the adder B8, a variable amplifier 10 for variably adjusting the level of digital data D1 produced by the equalizer B2, an adder B11 for adding together digital data D3 and D4 fed from the variable amplifiers B9 and B10, a further variable amplifier B12 for adjusting the level of digital data D5 produced by the adder B11 and for producing the above digital data Dout (FIG. 1).

Figure 3:
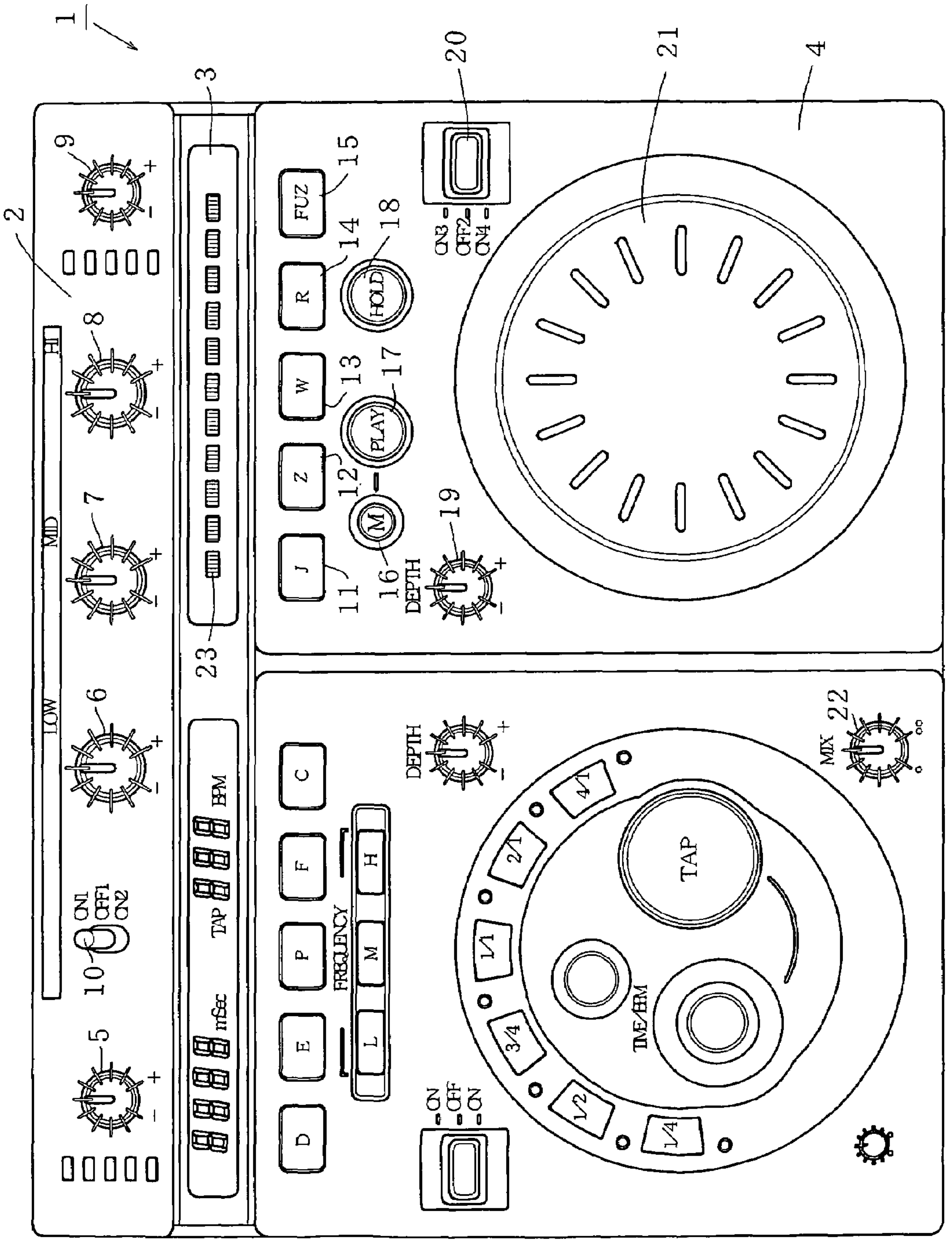
FIG. 3 is a plane view indicating an operating panel of the audio signal processing apparatus of FIG. 1.

The operating and indicating means 5–23 are disposed on an operating panel shown in FIG. 3.

Referring to FIG. 3, the operating panel has an equalizer operating section 2, an indicating section 3, and an overall operating section 4.

Referring again to FIG. 3, the equalizer operating section 2 includes an input signal adjusting knob 5, frequency characteristic adjusting knobs 6, 7, 8, an output signal adjusting knob 9, an equalizer starting switch 10.

The input signal adjusting knob 5 is so formed such that once it is rotated, the rotating amount may be detected by the system controller A1 which then gives a command to the variable amplifier B1, thereby causing the amplifier B1 to adjust the level of input digital data Din in accordance with the rotating amount.

Similarly, each of the frequency characteristic adjusting knobs 6, 7, 8 is so formed that once it is rotated, the rotating amount may be detected by the system controller A1 which then gives a command to the equalizer B2, thereby causing the equalizer B2 to adjust the frequency characteristic of digital data Din' fed from the amplifier B1 in accordance with the rotating amount.

In more detail, when the adjusting knob 6 is rotated, the frequency characteristic of a low band frequency component of digital data Din' may be adjusted. When the adjusting knob 7 is rotated, the frequency characteristic of a middle band frequency component of digital data Din' may be adjusted. When the adjusting knob 8 is rotated, the frequency characteristic of a high band frequency component of digital data Din' may be adjusted.

The equalizer starting switch 10 is provided to effect a change-over between condition a in which the frequency characteristics set by the knobs 6, 7 and 8 are used in digital data Din' and condition b in which the condition a is released. When the equalizer starting switch 10 is set at a position OFF1, this position will be detected by the system controller A1, the equalizer B2 will stop adjusting the frequency characteristic of digital data Din', so that the digital data Din' will be transmitted (without being processed) in the form of digital data D1.

When the equalizer starting switch 10 is set at a position ON1, a frequency characteristic adjusting effect is continued.

When the equalizer starting switch 10 is set at a position ON2, a frequency characteristic adjusting effect is continued only during an operation while the switch 10 is being set to the position ON2. Once a human operator's hand leaves the switch 10, the switch 10 will turn back to position OFF1 due to its self reaction force, thus releasing the above condition a.

In this way, by operating the frequency characteristic adjusting knobs 6, 7, 8 and the equalizer starting switch 10, it is possible to change the frequency characteristic of a musical sound in a desired manner. On the other hand, when the output signal adjusting knob 9 is rotated, its rotating amount will be detected by the system controller A1 which will then send a command to a further variable amplifier B12, thereby causing the amplifier B12 to adjust the level of the output digital data Dout in accordance with the rotating amount.

The indicator section 3 comprises a plurality of photo-diodes 23 aligned in one line, a rotating amount of a JOG dial 21 may be made understood by observing how many photo-diodes 23 are lightened.

The overall operating section 4 includes operating buttons 11–18, volume adjusting knobs 19 and 22, a performance starting switch 20, and the JOG dial 21.

On the back of the JOG dial 21 is provided an optical type pulse encoder 24 (FIG. 4A) which is adapted to detect an angular velocity Δ θ (in rotation) of the JOG dial 21 and its rotating direction to obtain a detection signal SR to be fed to the system controller A1.

Figure 4A:
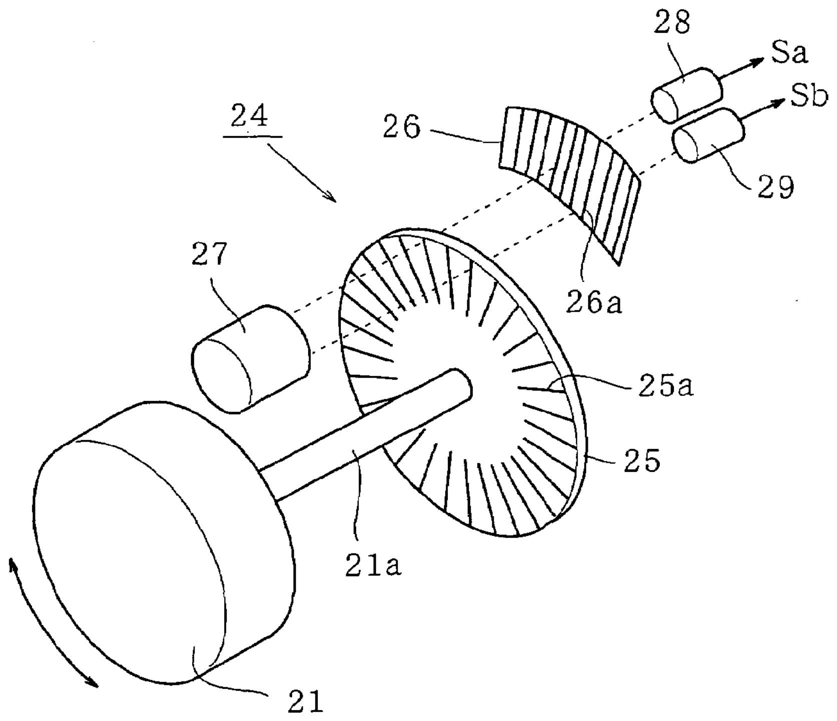
FIG. 4A is a view illustrating a pulse encoder.
Figure 4B:
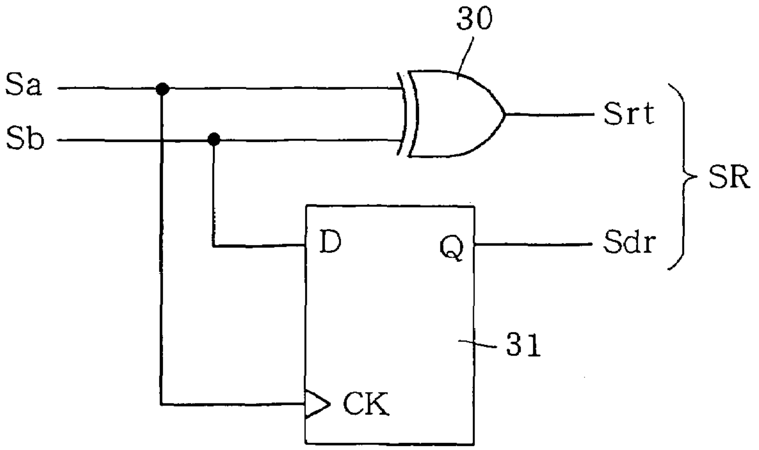
FIG. 4B is a block diagram indicating a circuit for use in the pulse encoder of FIG. 4A.

Referring to FIG. 4A, the pulse encoder 24 comprises a circular rotating plate 25 formed integrally with a rotating shaft 21*a* of the JOG dial 21, a plate 26 fixed on main frame structure of the apparatus 1 on one side of the rotating plate 25. Further, the pulse encoder 24 comprises a light emitting element 27 and a pair of light receiving elements 28, 29 in a manner such that the rotating plate 25 and the fixed plate 26 are positioned therebetween. Moreover, referring to FIG. 4B, the pulse encoder 24 has an EXOR gate 30 and a D-type flip-flop circuit 31, which are respectively connected with the light receiving elements 28 and 29.

Figure 5A:
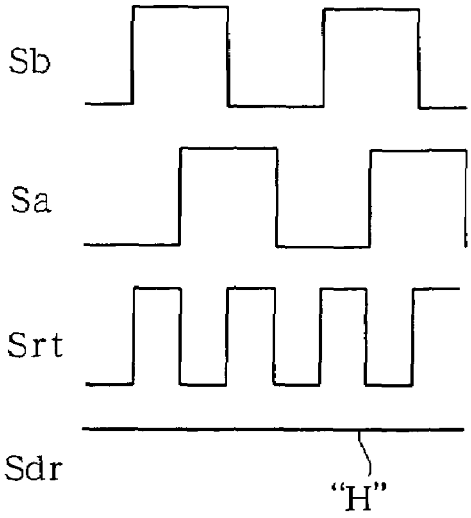
FIGS. 5A and 5B are timing charts indicating the operation of the pulse encoder.
Figure 5B:
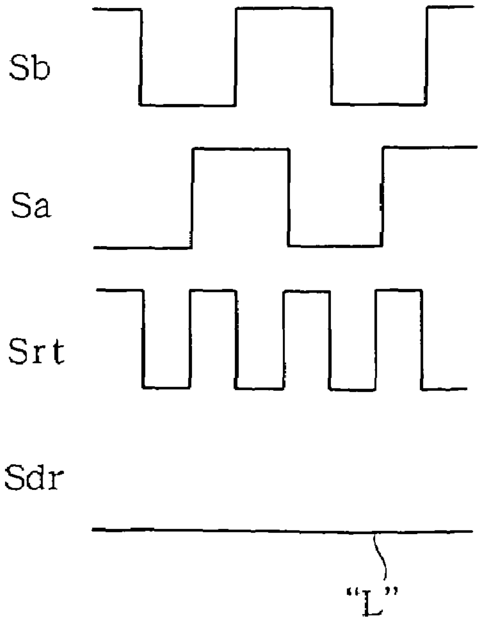

Referring again to FIG. 4A, the circular rotating plate 25 is formed with a plurality of slits 25*a*, the fixed plate 26 is also formed with a plurality of slits 25*a*, the light receiving elements 28 and 29 are arranged with a predetermined interval formed therebetween. By adjusting in advance the width of each of the slits 25*a* and 26*a* (areas allowing the passing of light) and width of each silt interval (areas not allowing the passing of light) between every two slits 25*a*, 25*a* and every two slits 26*a*, 26*a*, and by adjusting an interval between the two light emitting elements 28, 29, a rotating movement of the JOG dial 21 will generate, through the light emitting elements 28, 29, EXOR gate 30 and D-type flip-flop circuit 31, signals Sa Sb, Srt, Sdr having wave shapes shown in FIGS. 5A and 5B.

Namely, when the JOG dial 21 is rotated in the clockwise direction, the slits 25*a* of the rotating plate 25 will move relative to the slits 26*a* of the fixed plate 26. In this way, a light beam will partially pass through mutually aligned slits 25*a* and the slits 26*a* so as to be pulse-modulated. The modulated pulse light is received and detected by the light receiving elements 28 and 29, thereby producing detection signals Sa and Sb shown in FIG. 5A, with the phase of signal Sb advancing faster than that of the signal Sa. When the detection signals Sa and Sb are fed to the EXOR gate 30 and D-type flip-flop circuit 31, it is sure to produce an angular velocity signal Srt whose logical level changes in synchronism with the angular velocity $\Delta\theta$ of the JOG dial 21, and a direction signal Sdr of a logic "H" indicating that the JOG dial 21 is rotating in the clockwise direction. Then, the system controller A1 operates to analyze the logical level changes of both the angular velocity signal Srt and the direction signal Sdr, thereby determining that the JOG dial 21 is rotating in the clockwise direction and a value of its angular velocity $\Delta\theta$.

On the other hand, once the JOG dial 21 is rotated in the counterclockwise direction, the slits 25*a* of the rotating plate 25 will also move relative to the slits 26*a* of the fixed plate 26. In this way, a light beam will partially pass through mutually aligned slits 25*a* and the slits 26*a* so as to be pulse-modulated. The modulated pulse light is received and detected by the light receiving elements 28 and 29, thereby producing detection signals Sa and Sb shown in FIG. 5B, with the phase of signal Sb being delayed later than the that of the signal Sa. When the detection signals Sa and Sb are fed to the EXOR gate 30 and D-type flip-flop circuit 31, it is sure to produce an angular velocity signal Srt whose logical level changes in synchronism with the angular velocity $\Delta\theta$ of the JOG dial 21, and a direction signal Sdr of a logic "L" indicating that the JOG dial 21 is rotating in the counterclockwise direction. Then, the system controller A1 operates to analyze the logical level changes of both the angular velocity signal Srt and the direction signal Sdr, thereby detecting that the JOG dial 21 is rotating in the counterclockwise direction and a value of its angular velocity $\Delta\theta$.

Now, the operating buttons 11–18, the adjusting knobs 19 and 22, the performance starting switch 20, the JOG dial 21, the system controller A1, and the signal processing section A3, will be described in more detail in view of their functions.

Referring again to FIG. 1 and FIG. 3, an operating button 11 is called a JET button which, upon being pushed to be set in its ON state, will cause the change-over switch SW (FIG. 2) to contact a JET processing block B3, thereby starting the operation of the JET processing block B3. At this time, when a human operator turns the JOG dial 21, it is allowed to produce a musical sound including an effect sound of jet airplane, in accordance with an accumulated rotating amount $\theta$ and a rotating direction of the JOG dial 21.

Figure 6:
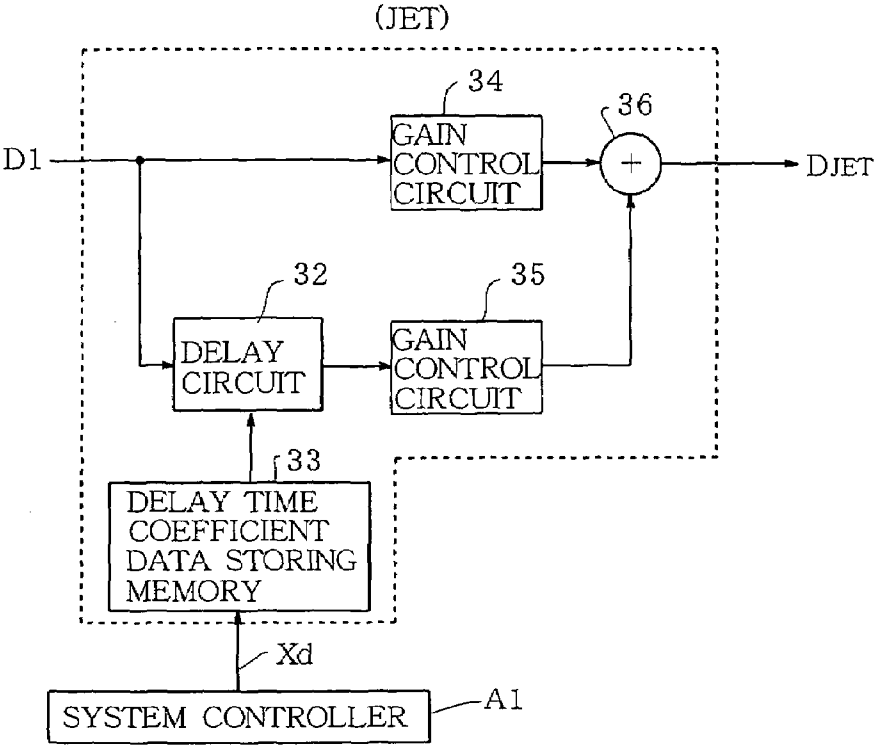
FIG. 6 is a block diagram indicating the constitution of JET processing block of the DSP.

Referring to FIG. 6, the JET processing block B3 comprises a delay circuit 32 for delaying digital data D1 fed from the equalizer B2, a delay time coefficient data storing memory 33 for storing a delay time coefficient data, a gain control circuit 34 for half-attenuating the level of the digital data D1, a gain control circuit 35 for half-attenuating the level of the digital data delayed in the delay circuit 32, an adder for adding together the two kinds digital data fed from the gain control circuits 34, 35.

In more detail, the delay time coefficient data storing memory 33 comprises a resister for storing a delay time coefficient data Xd fed from the system controller A1, the delay circuit 32 comprises a digital filter for setting a delay time Td in accordance with the delay time coefficient data Xd.

In fact, the system controller A1 is adapted to supply a delay time coefficient data Xd (corresponding to an accumulated rotating amount $\theta$ of the JOG dial 21). Accordingly, the delay time Td set by the delay circuit 32 will change corresponding to the accumulated rotating amount of the JOG dial 21.

FIG. 11 is a graph indicating how a delay time Td changes with respect to an accumulated amount and a rotating direction of the JOG dial 21. Referring to FIG. 11, when the JOG dial 21 is turned in the clockwise direction, a delay time Td is first increased and then decreased, and such a process is repeated continuously. Similarly, when the JOG dial 21 is rotated in the counterclockwise direction, a delay time Td is also first increased and then decreased, and such a process is repeated continuously.

In this way, by virtue of the JET processing block B4, the digital data D1 not receiving the time delay treatment and a digital data treated in the time delay treatment are added together, thereby producing a digital data DJET for generating an effect sound sounding like a jet airplane.

An operating button 12 is called ZIP button which, upon being pushed to be set in its ON state, will cause the change-over switch SW (FIG. 2) to contact a ZIP processing block B3, thereby starting the operation of the ZIP processing block B3. At this time, when a human operator rotates the JOG dial 21, it is allowed to produce a musical sound whose pitch (musical interval) changes in accordance with a rotating amount $\theta$ and a rotating direction of the JOG dial 21.

Figure 7:
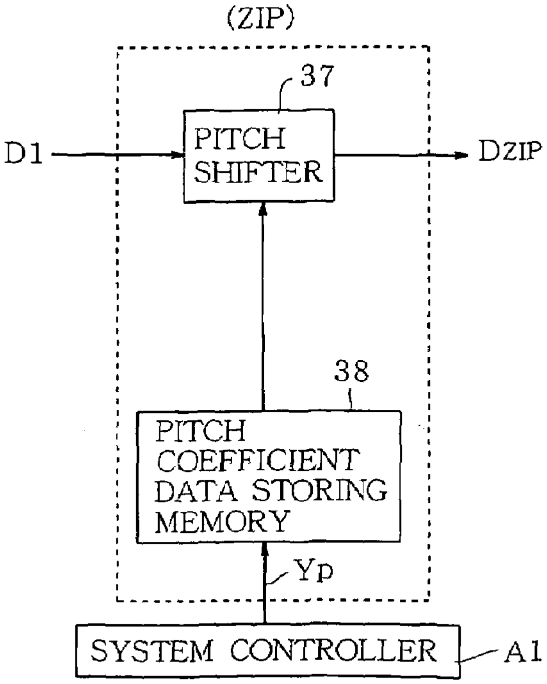
FIG. 7 is a block diagram indicating the constitution of ZIP processing block of the DSP.

Referring to FIG. 7, the ZIP processing block B4 comprises a pitch shifter circuit 37 and a pitch coefficient data storing memory 38. The pitch coefficient data storing memory 38 comprises a resister for storing a pitch coefficient data Yd fed from the system controller A1. The pitch shifter circuit 37 comprises a digital filter which is capable of adjusting the pitch Hp of the digital data D1 in accordance with the pitch coefficient data Yp.

In fact, the system controller A1 is adapted to supply a pitch coefficient data Yd (corresponding to an accumulated rotating amount $\theta$ of the JOG dial 21) to the pitch shifter circuit 37 through the pitch coefficient storing memory 38. Accordingly, in accordance with the rotating movement of JOG dial 21, it is possible to produce the digital data DZIP for generating an effect sound whose pitch (musical interval) changes.

Now, the principle of pitch adjustment will be described in the following with reference to FIG. 12 in which change of digital data D1 is indicated in the form of analogue wave for the convenience of easy explanation.

As shown in FIG. 12, when the digital data D1 shown in FIG. 12A is fed from the equalizer B2 to the ZIP processing block B4, if the pitch (musical interval) has been set to become pitch-up by virtue of the pitch coefficient data Yp, several data will be read out from the digital data D1, as shown in FIG. 12B. On the other hand, when the pitch (musical interval) has been set to become pitch-down, several data will be read out repeatedly from the digital data D1, as shown in FIG. 12C.

Figure 13:
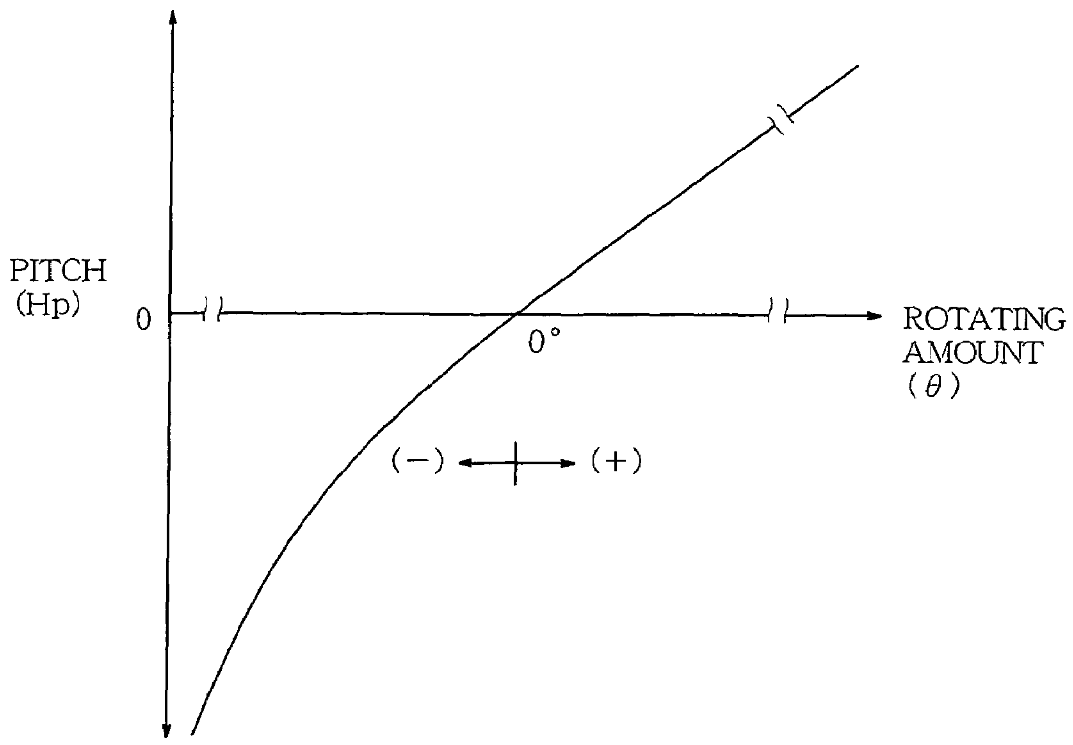
FIG. 13 is a graph indicating a relationship between a rotating amount of the JOG dial and a pitch (musical interval).

FIG. 13 is a graph indicating how the pitch Hp changes in relation to an accumulated rotating amount θ and a rotating direction of JOG dial 21. As shown in FIG. 13, when the JOG dial 21 is rotated in the clockwise direction by a predetermined amount, the pitch Hp will rise up by 10 octaves. On the other hand, when the JOG dial 21 is rotated in the counterclockwise direction by a predetermined amount, the pitch Hp will rise up by 15 octaves.

In this way, by operating the ZIP button 12 and the JOG dial 21, it is sure to obtain a ZIP performance effect of changing pitch (musical interval).

An operating button 13 is called WAH button which, upon being pushed to be set in its ON state, will cause the change-over switch SW (FIG. 2) to contact a WAH processing block B5, thereby starting the operation of the WAH processing block B5. At this time, when a human operator rotates the JOG dial 21, it is allowed to produce a musical sound whose frequency components have been changed, in accordance with a rotating amount θ and a rotating direction of the JOG dial 21.

Figure 8:
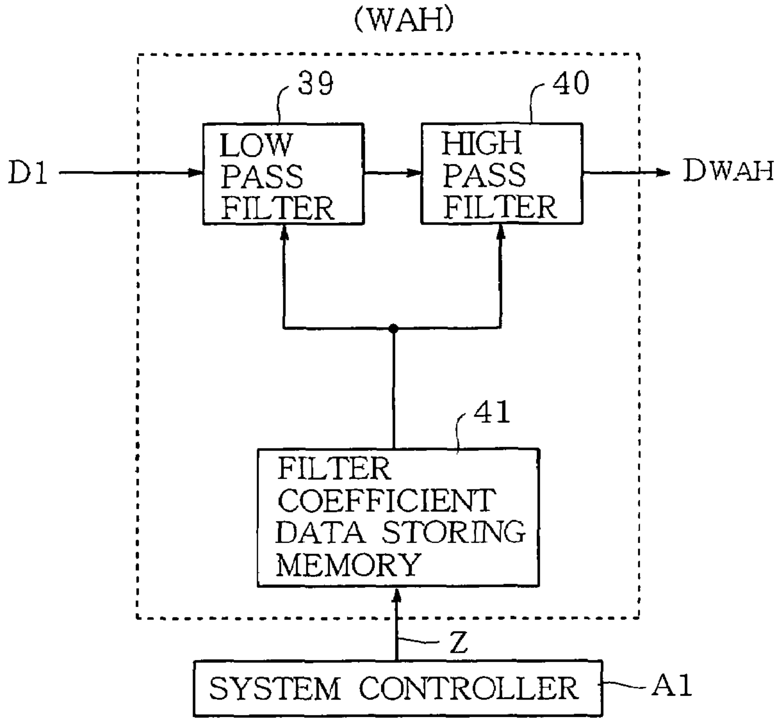
FIG. 8 is a block diagram indicating the constitution of WAH processing block of the DSP.

Referring to FIG. 8, WAH processing block B5 comprises a low pass filter 39 capable of variably controlling a high band cutoff frequency fCH, a high pass filter 40 capable of variably controlling a low band cutoff frequency fCL.

The filter coefficient storing memory 41 comprises a resister capable storing a filter coefficient data Z fed from the system controller A1. The low pass filter 39 and the high pass filter 40 are comprised of digital filters capable of variably controlling a high band cutoff frequency fCH and a low band cutoff frequency fCH.

Figure 14:
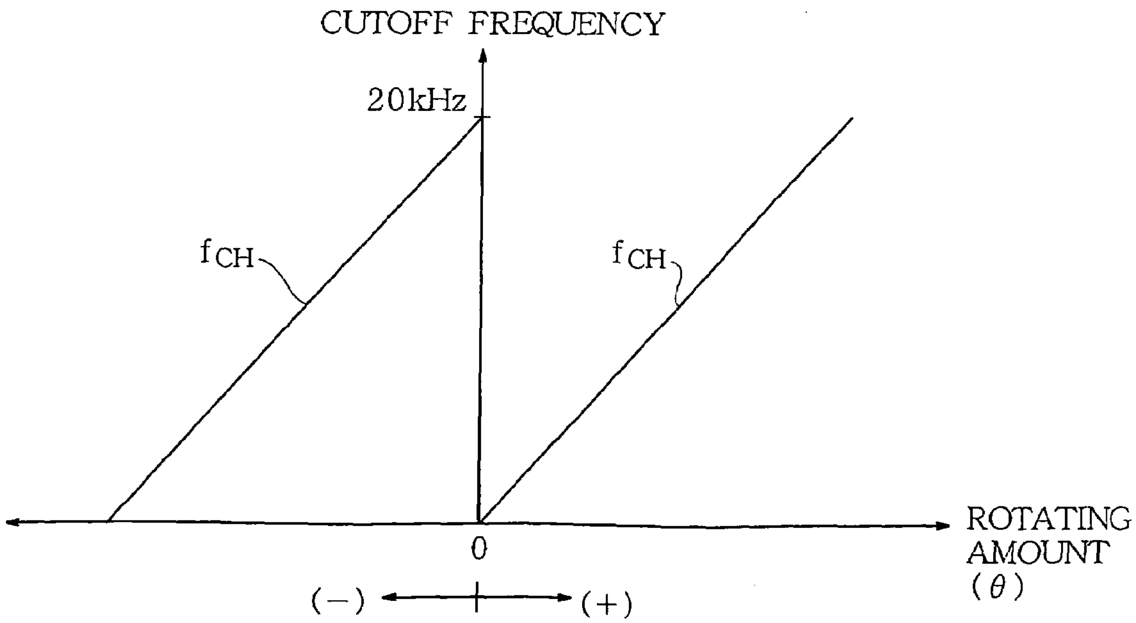
FIG. 14 is a graph indicating a relationship between a rotating amount of the JOG dial and a cutoff frequency.
Figure 15A:
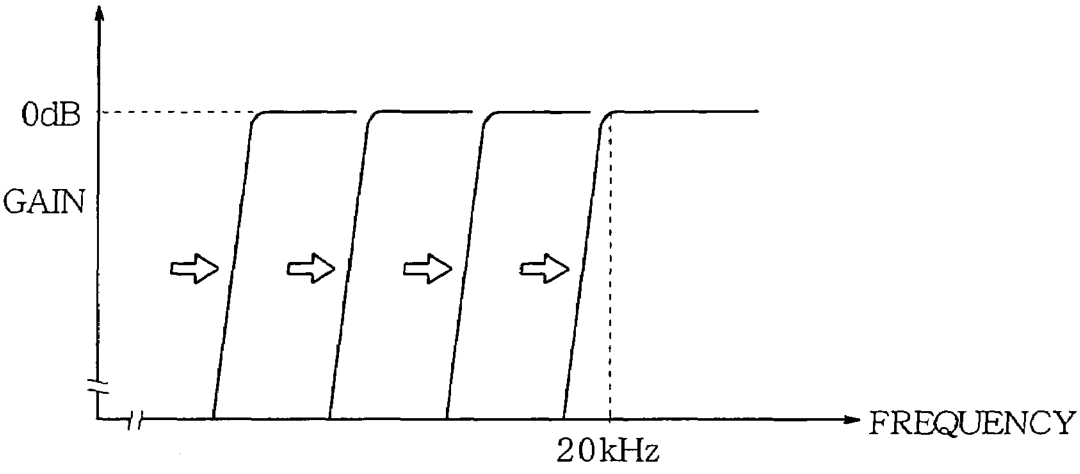
FIGS. 15A and 15B are graphs indicating a principle for producing a WAH performance effect.
Figure 15B:
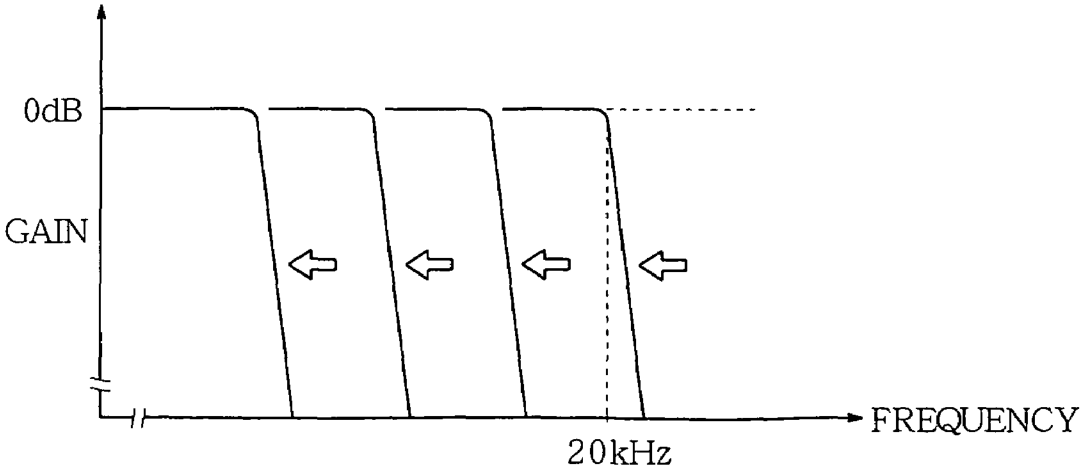

Referring to FIG. 14, the system controller A1 supplies a filter coefficient data Z (corresponding to an clockwise or counterclockwise rotating amount of the JOG dial 21) to the filter coefficient data storing memory 41, thereby gradually changing the high band cutoff frequency fCH and the low band cutoff frequency fCL. As a result, a high frequency band passing through the high pass filter 40 will change in a manner shown in FIG. 15A, while the low frequency band passing through the low pass filter 39 will change in a manner shown in FIG. 15B, thereby producing digital data DWAH capable of producing a WAH performance effect (extracting and then reproducing only predetermined part of audio signal).

On the other hand, when the WAH button 13 is not pushed, both the low pass filter 39 and the high pass filter 40 will allow the passing of all audible frequency components (having frequencies in a range of 0–20 KHz). As a result, there is no WAH function.

An operating button 14 is called RING button which, upon being pushed to be set in its ON state, will cause the change-over switch SW (FIG. 2) to contact a RING processing block B6, thereby starting the operation of the RING processing block B6. At this time, when a human operator rotates the JOG dial 21, it is allowed to produce a musical sound which sounds like a bell, in accordance with a rotating amount θ and a rotating direction of the JOG dial 21.

Figure 9:
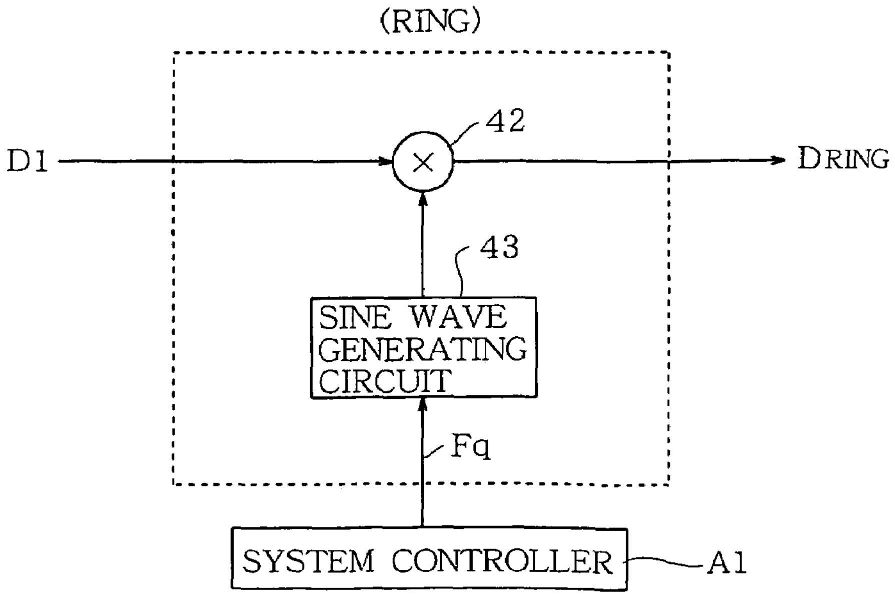
FIG. 9 is a block diagram indicating the constitution of RING processing block of the DSP.

Referring to FIG. 9, the RING processing block B6 comprises a sine wave generating circuit 43, a multiplier 42 capable of multiplying sine wave data (generated in the sine wave generating circuit 43) with the digital data D1. Frequency setting data Fq corresponding to an accumulated rotating amount of the JOG dial 21 is supplied from the system controller A1, thereby producing digital data DRING for producing a RING performance effect.

An operating button 15 is called FUZZ button (for producing musical sound containing a predetermined noise component). Upon being pushed to be set in its ON state, the change-over switch SW (FIG. 2) will contact a FUZZ processing block B7, thereby starting the operation of the FUZZ processing block B7. At this time, when a human operator rotates the JOG dial 21, it is allowed to produce a musical sound containing a predetermined noise component, in accordance with a rotating amount θ and a rotating direction of the JOG dial 21.

Figure 10:
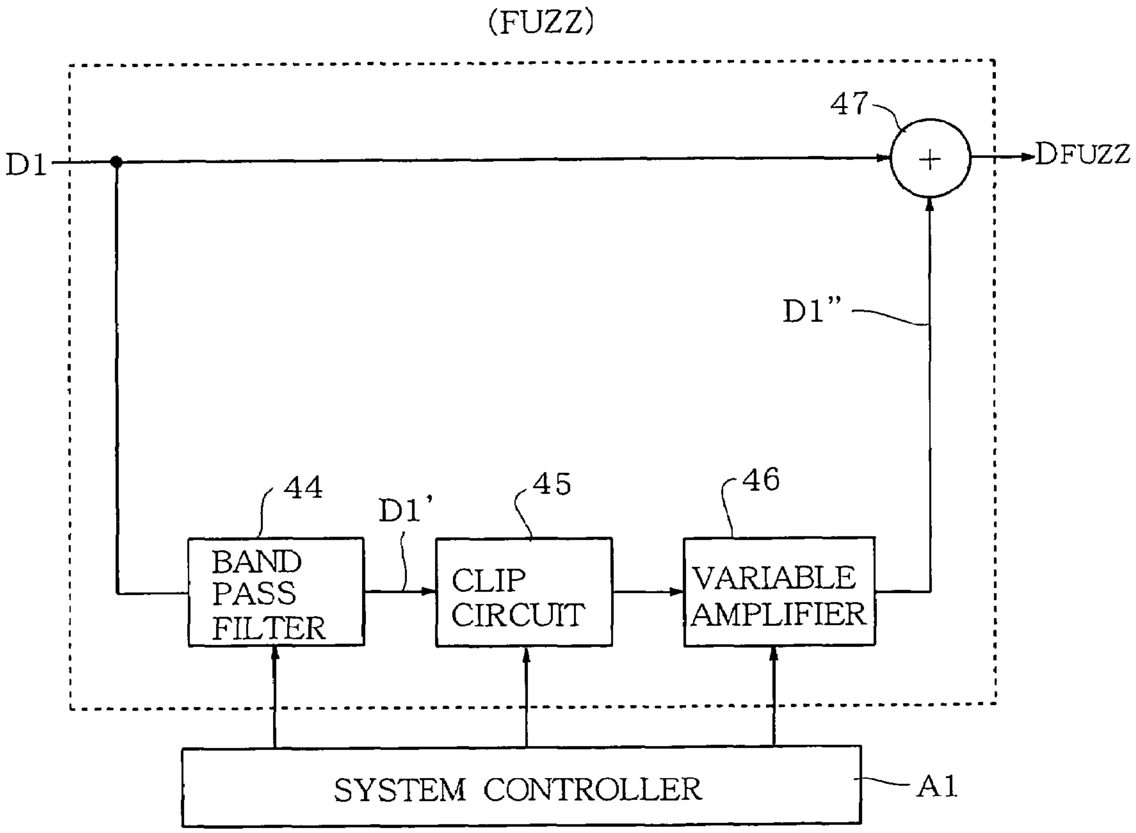
FIG. 10 is a block diagram indicating the constitution of FUZZ processing block of the DSP.

Referring to FIG. 10, the FUZZ processing block B7 comprises a band pass filter 44, a clip circuit 45, a variable amplifier 46, an adder circuit 47.

Further, the system controller A1, in accordance with a rotating amount θ and a rotating direction of the JOG dial 21, may change the frequency band of the frequency component passing through the band pass filter 44. The clip circuit 45 is provided to limit the level of the digital data D1' passed through the band pass filter 44. By changing the amplification factor of the variable amplifier 46 (corresponding to a rotating amount of the operating knob 19 shown in FIG. 3), it is possible to produce a digital data D1" including a predetermined distortion. Further, by adding together the digital data D1" and the original digital data D1 in the adder 47, it is sure to produce the digital data DFUZZ for producing a musical sound containing a predetermined noise component.

The operating knob 19 is also called a depth adjusting knob for adjusting the extent of a performance effect (depth).

Further, an operating button 18 is called a HOLD button. Under a condition where the HOLD button 18 has been set in its ON state, once the JOG dial 21 is stopped after having been rotated to some extent, its rotating condition (angular velocity Δθ and its rotating direction) just before the stop thereof is stored in a memory (not shown). Then, by accumulating angular velocity (an addition calculation is performed when there is a clockwise rotation, while a subtraction calculation is performed when there is a counterclockwise direction) in accordance with the stored rotating direction, it is sure to obtain a latest accumulated rotating amount θ. Further, in accordance with the latest accumulated rotating amount θ, a predetermined process automatically effected by the signal processing section A3 is continued.

On the other hand, under a condition where the HOLD button 18 is in its OFF state, a human operator is allowed to operate any one of the above operating buttons 11–15. In this way, various performance effects corresponding to the operating buttons 11–15 may be obtained in synchronism with the rotating movement of the JOG dial 21. However, when the rotating movement of the JOG dial 21 is stopped, the musical sound will gradually change back to its original state not having any performance effect.

Thus, under a condition where the HOLD button 18 has been set in its ON state, once the JOG dial 21 is stopped after having been rotated to some extent, its rotating condition (angular velocity Δθ and its rotating direction) just before the stop thereof may be stored in a memory (not shown). In this way, the performance effect may be maintained by operating any one of the operating buttons 11–15 in accordance with the latest rotating amount θ, thereby continuously producing musical sound having a predetermined performance effect.

An operating button 16 is called a memory button. When the memory button 16 is first pushed ON and then pushed OFF, a angular velocity Δθ and a rotating direction of the JOG dial 21 rotated during a time period from said ON to said OFF may be stored in a past operation recording memory within the storing section A4.

Figure 16:
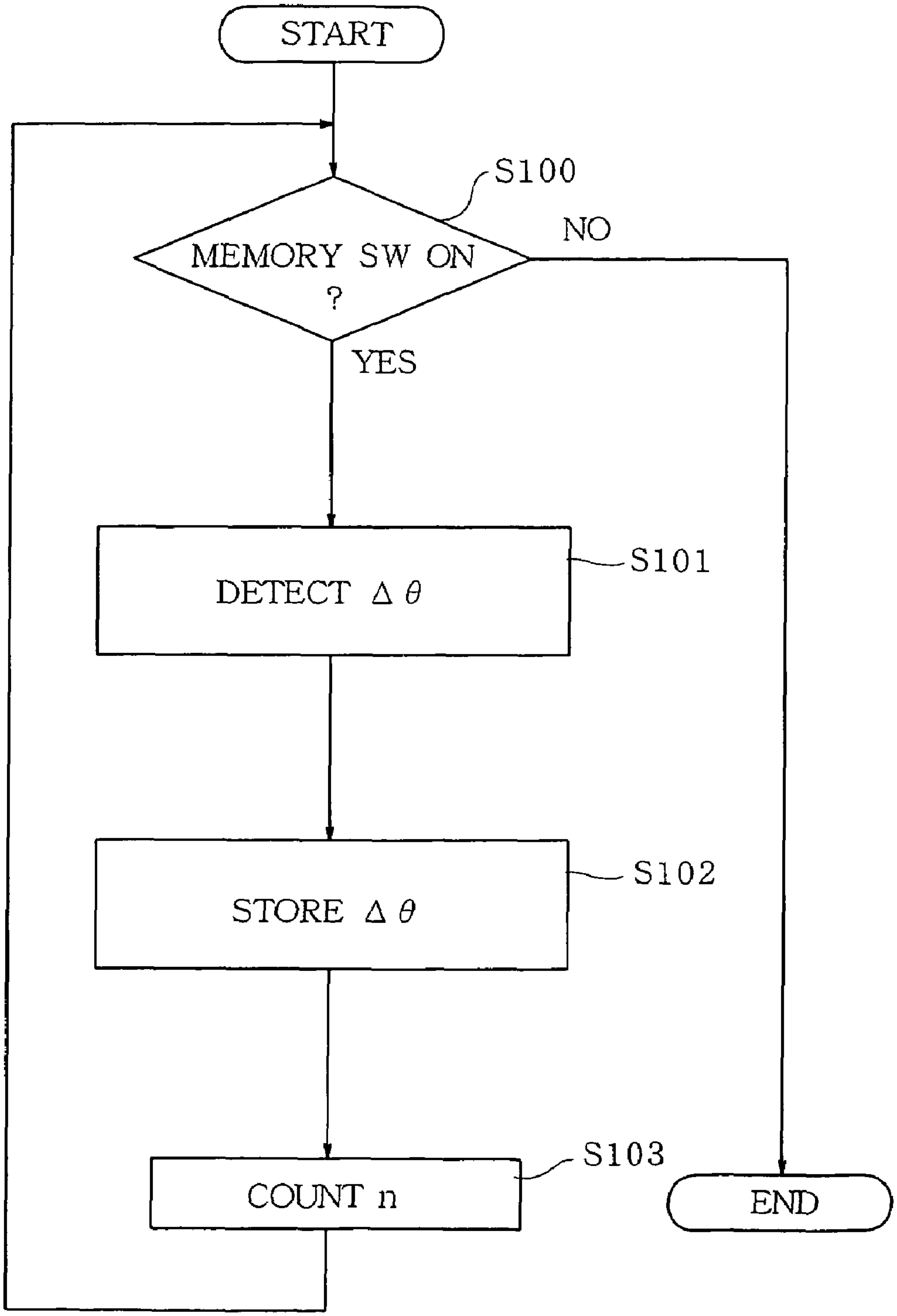
FIG. 16 is a flowchart indicating an operation of the audio signal processing apparatus when a memory button is operated.

In more detail, as shown in a flowchart of FIG. 16, when the memory button 16 is pushed to be set in its ON state, at a step S100 an answer YES is obtained. Then, at a next step 101, an angular velocity Δθ and a rotating direction of the JOG dial 21 are detected in accordance with a direction signal Sdr and an angular velocity signal Srt fed from the pulse encoder 24. Further, at a step S102, memory address of the past operation recording memory is incremented so as to store the data of the angular velocity Δθ and the rotating direction of the JOG dial 21. Subsequently, at a step 103, the numbers of data stored in the memory is counted, and the above steps S100–S103 are repeated until the memory button 16 is set to its OFF state, thereby storing a series of past operation data of the JOG dial 21.

An operating button 17 is called PLAY button which is used in relation with the memory button 16. Namely, when the PLAY button 17 is pushed ON, the past data of the angular velocity Δθ and the rotating direction (of the JOG dial 21) stored in the past operation recording memory are read-out successively, so as to calculate an accumulated rotating mount θ of the JOG dial 21 in accordance with a rotating direction thereof.

In this way, by controlling the processing blocks B3–B7 in accordance with an accumulated rotating amount θ of the JOG dial 21, it is possible to easily perform various treatments of the processing blocks B3–B7.

When the number of the data read-out from the above past operation recording memory reaches the number n, an addressing process in the past operation recording memory is again started with a first memory address, thereby continuously effecting treatments by the processing blocks B3–B7. Similarly, these treatments by the processing blocks B3–B7 are continued until the PLAY button 17 is pushed to be set in its OFF state.

In this way, the PLAY button 17 acts as designating means capable of automatically effecting a desired treatment, in accordance with the past operation data stored in the past operation recording memory. When the PLAY button 17 and the memory button 16 are operated in relation with each other, a desired performance effect may be obtained continuously without having to operating the JOG dial 21, thereby ensuring an improved operability of the audio signal processing apparatus. Further, when the PLAY button 17 and the memory button 16 are again operated in relation with each other, it is possible to store in the past operation recording memory some new data concerning a series of angular velocity Δθ and the rotating direction of the JOG dial 21, thereby making it possible to change one kind of treatment to another. Further, when the PLAY button 17 and the memory button 16 are operated in relation to each other, since it is possible to store in the past operation recording memory a series of angular velocity Δθ and the rotating direction of the JOG dial 21 during a period from the start to the end of its rotating movement, it is allowed to produce different functions when performance treatments are executed in accordance with the rotation history of the JOG dial 21.

An adjusting knob 22 (FIG. 3) is provided to adjust the amplification factors of the variable amplifiers B9, B10 (FIG. 2). When the adjusting knob 22 is turned in the clockwise direction, the amplification factor of the amplifier B9 will increase whilst the amplification factor of the amplifier B10 will decrease. In this way, as shown in FIG. 2, digital data D4 obtained through the amplifier B10 will have a lower level than that of digital data D3 obtained through the amplifier B9. Referring again to FIG. 2, the digital data D3 and the digital data D4 are added together in the adder circuit B11, thereby producing digital data D5 having a higher content of a processed component than that of an original musical sound.

On the other hand, when the adjusting knob 22 is rotated in the counter clockwise direction, the amplification factor of the amplifier B9 will decrease whilst the amplification factor of the amplifier B10 will increase. In this way, digital data D4 obtained through the amplifier B10 will have a higher level than that of digital data D3 obtained through the amplifier B9. As shown in FIG. 2, the digital data D3 and the digital data D4 are added together in the adder circuit B11, thereby producing digital data D7 having a lower content of a processed component than that of an original musical sound.

Therefore, by operating the adjusting knob 22, it is possible to optionally set a desired mixing ratio of an original musical sound component to a processed component.

Here, although the amplification factors of the variable amplifiers B9 and B10 will be varied by adjusting the knob 22, an automatic level adjustment may be effected so that the variation in the amplification factors of the variable amplifiers B9, B10 (FIG. 2) will not cause any change in the level of digital data D5 produced by the adder B11.

Namely, the variable amplifiers B9 and B10 are caused to operate under predetermined amplification factors. By virtue of a relative variation in the amplification factors of the variable amplifiers B9 and B10, a mixing ratio of data D1 to D2 can be adjusted. As a result, although the mixing ratio of digital data D1 to digital data D2 may be changed by virtue of the adjusting knob 22, there would be no change in a stereo audio signal Sout fed through D/A converter A5.

Then, the output stereo audio signal Sout may be amplified by a variable amplifier B12 which is interlocked with an output adjusting knob 9.

Now, the function of the switch 20 will be described further in the following.

Namely, when the switch 20 is moved to a position OFF2, such a movement will be detected by the system controller A1, so that the operation of the signal processing section A3 is released, and thus the digital data D1 from the equalizer B2 is fed out as a digital data Dout without being processed to any extent.

Further, when the switch 20 is moved to a position ON3, the processing of the digital data D1 will be continued. Moreover, when the switch 20 is moved to a position ON4, the processing of the digital data D1 is continued only during such movement of the switch 20, but will be stopped once the hand of the human operator leaves the switch 20, because the switch will soon return back to the position OFF2 due to a self reaction force.

The operation of the audio signal processing apparatus having the above-described constitutions will be explained in the following with reference to a flowchart shown in FIG. 17, which flowchart is based on an example indicating a series of operations when performing the JET function.

Figure 17:
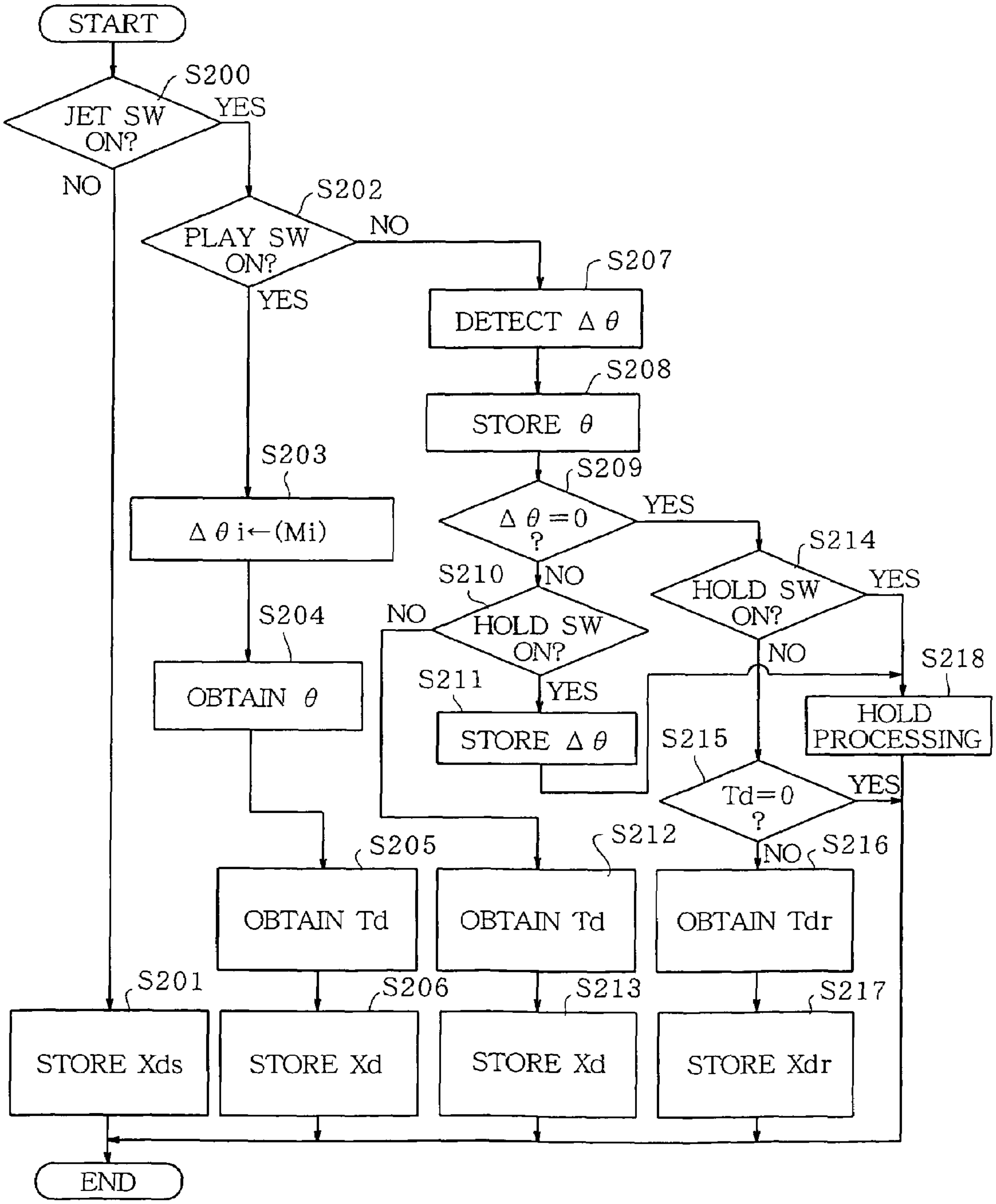
FIG. 17 is a flowchart indicating an operation of the audio signal processing apparatus when producing a JET performance effect.

Referring to FIG. 17, at a step S200 it is determined whether the JET button 11 has been set to its ON state. If it is determined at the step S200 that the JET button 11 is not at its ON state, a delay time coefficient data Xd (=Xds) corresponding to a delay time Td=0 is stored in the delay time coefficient data storing memory 33 of the JET processing block B3 (step 201). In this way, the JET function can not be effected.

On the other hand, if it is determined at the step S200 that the JET button 11 has been set in its ON state, it is then determined at a step S202 whether the PLAY button 17 has been set in its ON state. If it is determined at a step S202 that the PLAY button 17 has been set in its ON state, the program goes to a step S203, if not, the program goes to a step S207.

At the step S203, angular velocity (Δθi) data and rotating direction data are read out from the past operation recording memory Mi. Then, at a step S204, angular velocities (Δθi) are added together so as to obtain an accumulated rotating amount θ. Subsequently, at a step S205, a delay time Td corresponding to an accumulated rotating amount θ is calculated. Afterwards, at a step S206, a delay time coefficient data Xd (=Xds) corresponding to the delay time Td is stored in the delay time coefficient data storing memory 33 of the JET processing block B3. In this way, even if the JOG dial 21 is not rotated, the JET operation may still be continued in accordance with the angular velocity (Δθi) stored in the past operation recording memory.

On the other hand, once the program goes from the step S202 to the step S207, the angular velocity Δθ and the rotating direction of the JOG dial 21 are measured (step S207). Then, at a step S208, the angular velocity Δθ is added into the above accumulated rotating amount θ in accordance with the rotating direction, thereby obtaining the latest accumulated rotating amount θ which is then stored in a predetermined memory in the storing section.

Then, at a step S209, it is determined whether the angular velocity Δθ is 0 (JOG dial 21 is in a stopped state). If it is determined at the step S209 that the JOG dial 21 is not in a stopped state, it is then determined at a step S210 whether the HOLD button 18 is in its ON state. If it is determined at the step S210 that the HOLD button 18 is not in its ON state, the program goes to a step S212 to calculate a delay time Td corresponding to the latest accumulated rotating amount θ. Subsequently, at a step S213, the delay time coefficient data Xd corresponding to the delay time Td is stored in the delay time coefficient storing memory 33 of the JET processing block B3. In this way, it is possible to provide the JET function without using the HOLD function.

On the other hand, if it is determined at the step S210 that the HOLD button 18 is in its ON state, the program goes to a step S211 at which the angular velocity Δθ is stored in a velocity memory contained in the storing section A4. Then, at the step 218, a delay time coefficient data Xd corresponding to the latest rotating amount θ is stored in the delay time coefficient memory 33 of the JET processing block B3. In this way, it is possible to provide the JET function while at the same time using the HOLD function.

If at the above step 209 it is determined that the JOG dial 21 is in a stopped state, the program goes to a step S214 at which it is determined whether the HOLD button 18 is in its ON state. If it is determined at the step S214 that the HOLD button 18 is in its ON state, the program goes to the step S218 to effect the JET function while at the same time using the HOLD function.

On the other hand, if it is determined at the step S214 that the HOLD button 18 is not in its ON state, the delay time Td is gradually reduced during steps 215–217, so as to gradually stop the JET function, allowing the musical sound to return to its original state. Namely, if it is determined at the step 215 that the delay time Td is not Td=0, the program goes to a step S216 which produces another delay time Tdr that can be used to gradually reduce the delay time Td. For example, a predetermined ΔTd is subtracted from the present delay time Td so as to obtain a subtraction result (Td−ΔTd) which can be used as the delay time Tdr.

Further, at the step S217, a delay time coefficient data Xd(=Xdr) corresponding to the delay time Td is stored in the delay time coefficient storing memory 33 of the JET processing block B3 so as to replace the formerly stored delay time Td. In this way, the JET effect is gradually reduced while the step 216 and the step 217 are repeated until it is determined at the step 215 that the delay time Td becomes 0 (Td=0).

In fact, the program shown in the flowchart of FIG. 17 can also be used when any one of the functions ZIP, WAH, RIN and FUZZ has been selected.

According to this embodiment of the present invention, in accordance with a rotating amount of the JOG dial 21, a delay time coefficient data Xd, a filter coefficient data Z, a pitch coefficient data Yp (all for the operations of the above processing blocks B3–B7) may be set in accordance with the angular velocity Δθ of the JOG dial 21, it is sure to provide an audio signal processing apparatus having an improved operability.

Further, by operating a memory button 16, an angular velocity Δθ of the JOG dial 21 may be stored in the form of the past rotation data of the JOG dial 21. Thus, by operating the PLAY button 17, various processings for producing various functions may be continuously effected only in accordance with the angular velocity Δθ, without having to directly operate the JOG dial 21, thereby allowing a user to operate the audio signal processing apparatus with great ease. Moreover, when the operations of the memory button 16 and the PLAY button 17 are repeated, a series of angular velocities Δθ may be newly stored in the past operation recording memory, thereby exactly ensuring the production of various musical effects.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. An audio signal processing apparatus, comprising:

signal processing means for processing audio signals fed from outside equipment;

operating means for setting parameters in order for said signal processing means to process the audio signals;

storing means for storing a sequential series of past operations that can be read-out successively, said past operations being associated with a series of movements of said operating means;

designating means capable of automatically effecting a desired treatment in accordance with the past operation data stored in the storing means; and control means for setting parameters in order for said signal processing means to process the audio signals in accordance with said desired treatment when said designating means is operated.

2. The audio signal processing apparatus according to claim 1, further comprising a first executing means enabling said storing means to store said series of past operation data, a second executing means enabling said signal processing means to process the audio signals in accordance with said series of past operation data stored in said storing means.

3. The audio signal processing apparatus according to claim 1, wherein said operating means includes a rotational body capable of setting parameters in order for said signal processing means to process the audio signals, in accordance with a rotating amount of the rotational body.

4. The audio signal processing apparatus according to claim 3, wherein the rotational body of said operating means is connected with an optical pulse encoder for detecting an angular velocity and an rotating direction of the rotational body.

5. The audio signal processing apparatus according to claim 4, wherein the angular velocity and the rotating direction of the rotational body are used to calculate the rotating amount of the rotational body.

6. The audio signal processing apparatus according to claim 1, wherein said signal processing means includes a digital signal processor comprising a JET processing block, a ZIP processing block, a WAH processing block, a RING processing block and a FUZZ processing block.

7. An audio signal processing apparatus, comprising:

a signal processor which processes audio signals fed from outside equipment;

an operating device which sets parameters in order for the signal processor to process the audio signals;

a memory device for storing a sequential series of past operations that can be read-out successively, said past operations being associated with a series of movements of the operating device;

a designating device capable of automatically effecting a desired treatment in accordance with the past operation data stored in the memory device; and a controller which sets parameters in order for the signal processor to process the audio signals in accordance with the desired treatment when the designating device is operated.

* * * * *